United States Patent [15] 3,664,177
Bridgeman et al. [45] May 23, 1972

[54] PORTABLE DEW POINT HYGROMETER

[72] Inventors: Richard C. Bridgeman, Northbrook; Wieslaw Gajewski, Evanston, both of Ill.

[73] Assignee: Vapor Corporation, Chicago, Ill.

[22] Filed: Aug. 17, 1970

[21] Appl. No.: 64,160

[52] U.S. Cl. ......................................................73/17 A
[51] Int. Cl. ......................................................G01n 25/02
[58] Field of Search.....................................................73/17

[56] References Cited

UNITED STATES PATENTS

| | | | |
|---|---|---|---|
| 3,416,356 | 12/1968 | Bridgeman | 73/17 |
| 3,552,186 | 1/1971 | Sproul | 73/17 |
| 2,680,371 | 6/1954 | Donath | 73/17 |
| 3,177,716 | 4/1965 | Warman | 73/17 |
| 2,108,173 | 2/1958 | Martin et al. | 73/17 |
| 2,758,470 | 8/1956 | Hartman | 73/17 |
| 3,195,344 | 7/1965 | Francisco | 73/17 |

Primary Examiner—Richard C. Queisser
Assistant Examiner—Herbert Goldstein
Attorney—Julian Falk, Chester A. Williams, Jr., Marshall J. Breen and Kinzer, Dorn & Zickert

[57] ABSTRACT

A dew point hygrometer for measuring the moisture content of a gas that includes a self-contained power supply in the form of a battery and a compressed gas supply. The electrical conductivity of the water vapor in the sampling gas near the dew point is measured by a sensor, the temperature of which is also measured as well as the rate of cooling the sensor to determine the dew point temperature of the sampling gas. The battery powers electrical circuitry for making the measurements, while the compressed gas is utilized for cooling the sensor.

6 Claims, 12 Drawing Figures

INVENTORS
RICHARD C. BRIDGEMAN
WIESLAW GAJEWSKI
BY
ATTORNEY

PORTABLE DEW POINT HYGROMETER

This invention relates in general to a dew point hygrometer, and more particularly to a portable dew point hygrometer that is light-weight and compact so that it may be utilized in the field, and still more particularly to a portable dew point hygrometer that is battery operated and depends on a mechanical cooling method for driving a sampling gas toward its dew point temperature.

Dew point hygrometers heretofore have not been capable of full portable use because of the dependence upon line power for operation. Moreover, dew point hygrometers heretofore have been large and/or heavy which would obviously restrict portability. Therefore, a need has arisen for a compact completely portable instrument for conducting dew point readings in the field. Particularly, the natural gas industry has determined a need for such an instrument.

The hygrometer of the invention is operable by battery or 115 volt AC line power and includes a conductivity type sensor. The sensor mounted on a sensor block is cooled by a mechanical cooling method, wherein a compressed gas refrigerant is allowed to expand in a chamber of a sensor block on which the sensor is mounted. Conveniently, a Freon type refrigerant is used, but others such as liquid carbon dioxide, liquid propane, liquid butane or the like may be utilized. The standard and readily available 15 ounce can of Freon 12 is especially satisfactory. The sensor assembly is mounted in the gas sampling chamber, all of which is capable of withstanding pressures from vacuum to 1,000 PSI, thereby providing a hygrometer capable of high pressure dew point readings. Dew point readings of various gases at various pressures can therefore be made by the instrument of the invention. The temperature readout and control circuitry includes a dew point meter, a cooling rate meter and a sensor temperature meter. The circuitry, being solid state, requires low power consumption and a small battery supply is capable of powering the unit. A manual adjustable metering valve controls the supply of compressed gas to the sensor block expansion chamber and the cooling rate meter tells the operator how to adjust the metering valve to obtain the proper cooling rate of the sensor. It is important that a cooling rate of about ½° to 1° temperature decline be maintained to provide equilibrium in the measuring circuitry to prevent overshooting of the dew point temperature. The sensor temperature meter includes a read region which indicates to the operator when the dew point temperature is to be read from the dew point temperature meter. Accordingly, precise moisture measurement of gases can be made.

It is therefore an object of the present invention to provide a new and improved dew point hygrometer capable of complete portability for use in the field to determine the dew point of various gases at various pressures.

Another object of the present invention is in the provision of a light-weight and compact dew point hygrometer that is battery operated and provided with a compressed gas supply for obtaining mechanical cooling of the sensor.

A still further object of the invention is to provide a completely portable dew point hygrometer capable of giving fast, accurate and economical measurement of dew point temperatures of gases.

Another object of this invention is in the provision of a dew point hygrometer having complete field portability, and operable under battery or AC power, wherein low power consumption is realized due to utilizing the mechanical expansion cooling technique for cooling the sensor.

Other objects, features and advantages of the invention will be apparent from the following detailed disclosure, taken in conjunction with the accompanying sheets of drawings, wherein like reference numerals refer to like parts, in which.

Figure 1:
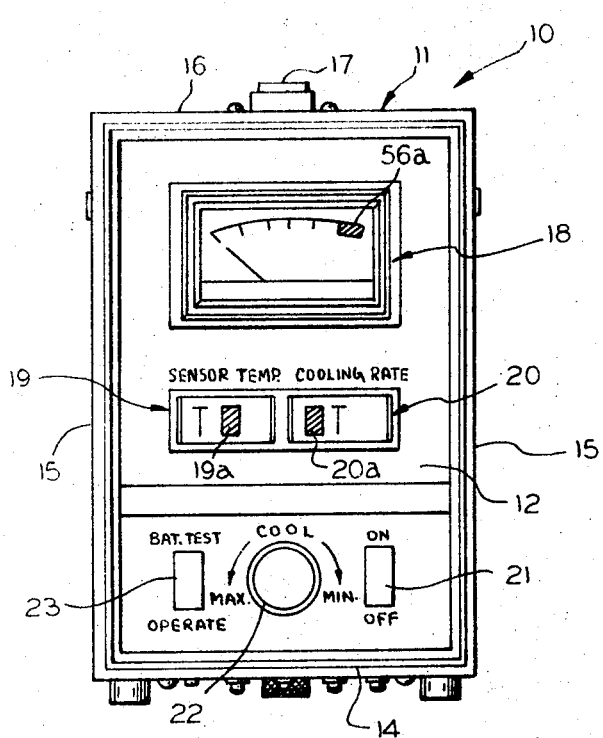
FIG. 1 is a front elevational view of the dew point hygrometer of the present invention.
Figure 2:
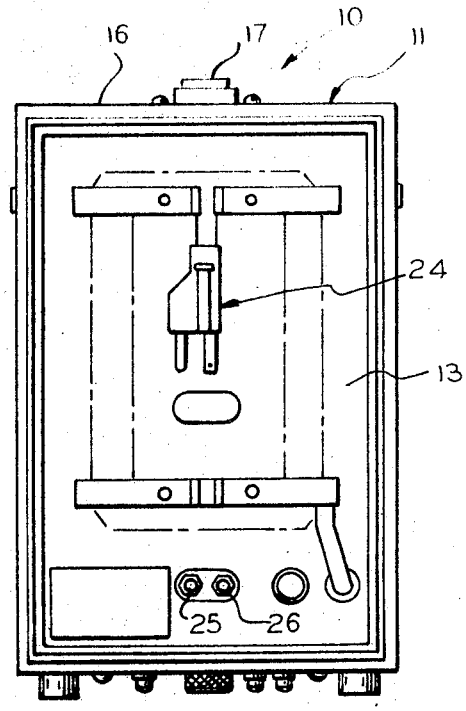
FIG. 2 is a rear elevational view of the hygrometer.
Figure 3:
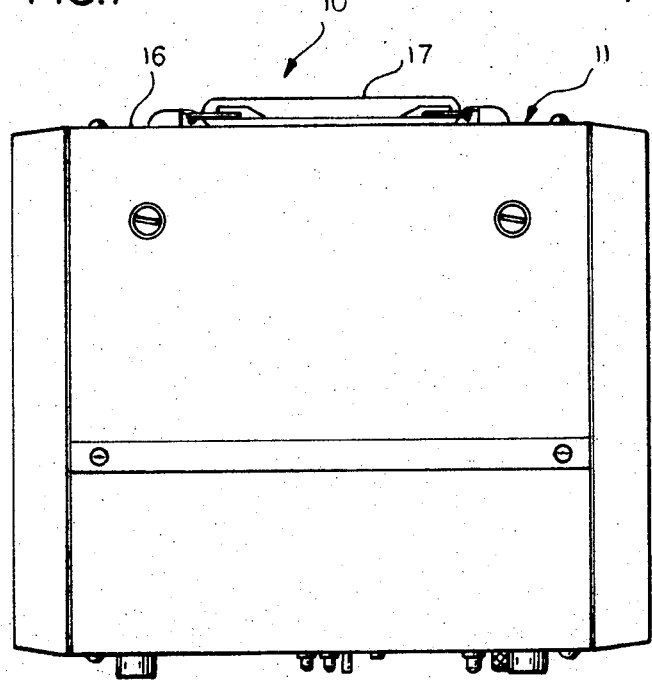
FIG. 3 is a side elevational view of the hygrometer, the other side being substantially the same.

Referring now to the drawings the portable dew point hygrometer of the invention, generally indicated by the numeral 10 includes a case or housing 11 as shown in FIGS. 1 to 3. The housing includes a front panel 12 with instrumentation and controls, a back panel 13 with connection fittings, a base panel 14, side panels 15 and a top panel 16. A carrying handle 17 is mounted on the top panel 16.

On the front panel 12 readout of dew point measurements is conducted by observing a dew point temperature meter 18, a sensor temperature meter 19 and a cooling rate temperature meter 20. Controls on the front panel include an on-off switch 21 for operating the temperature readout and control circuitry, a metering valve knob 22 for controlling the supply of refrigerant to the sensor assembly, and a battery testing switch 23 to determine the condition of the batteries.

On the rear panel 13, an AC line cord 24 enables connection of the temperature readout and control circuitry to AC power, and sampling chamber inlet and outlet fittings 25 and 26 to be suitably connected to a source of gas to be tested.

When testing a gas for dew point temperature, it is only necessary to connect the gas to the inlet and outlet fittings 25 and 26, and then proceed to operate the controls to determine the dew point of that gas. The temperature read-out and control circuitry is energized by operation of the on-off switch 21, and the sensor is cooled by operating the cooling knob 22 which admits gas to the expansion chamber of the sensor assembly. Thereafter the meters are read to determine dew point temperature.

Figure 4:
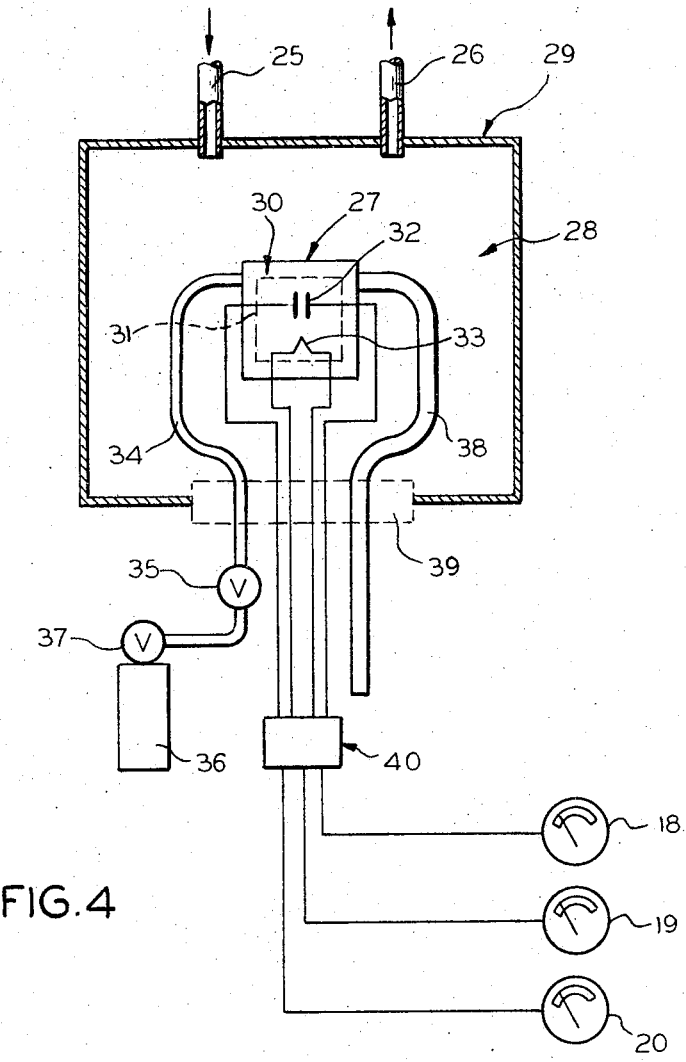
FIG. 4 is an operational diagrammatic block diagram of the hygrometer.

In order to better understand the general operation of the hygrometer, reference is made to a diagrammatic block shown in FIG. 4 wherein the sensor is generally indicated by the numeral 27, and which is shown as being arranged within a gas sampling chamber 28 of the gas sampling housing 29.

The sensor assembly includes generally a cooling block 30 having an expansion chamber 31 defined therein, a sensor grid 32 mounted on the cooling block and exposed to the sampling gas in the sampling chamber, and a linear precision thermistor 33 mounted on the cooling block. Inlet tubing 34 connects the inlet of the expansion chamber 31 to a manual adjustable precision metering valve 35 that is in turn connected to a can 36 of compressed gas. A suitable tapping valve 37 may be provided for the can. Outlet tubing 38 connects the outlet of the expansion chamber to atmosphere. The leads for the thermistor and sensor grid, and the inlet and outlet tubings extend through an epoxy sealing cap 39 provided at the wall of the gas sampling chamber housing. The leads from the sensor grid and the thermistor extend to a temperature readout and control circuitry 40 and are then interconnected with the readout meters 18, 19 and 20.

Figure 5:
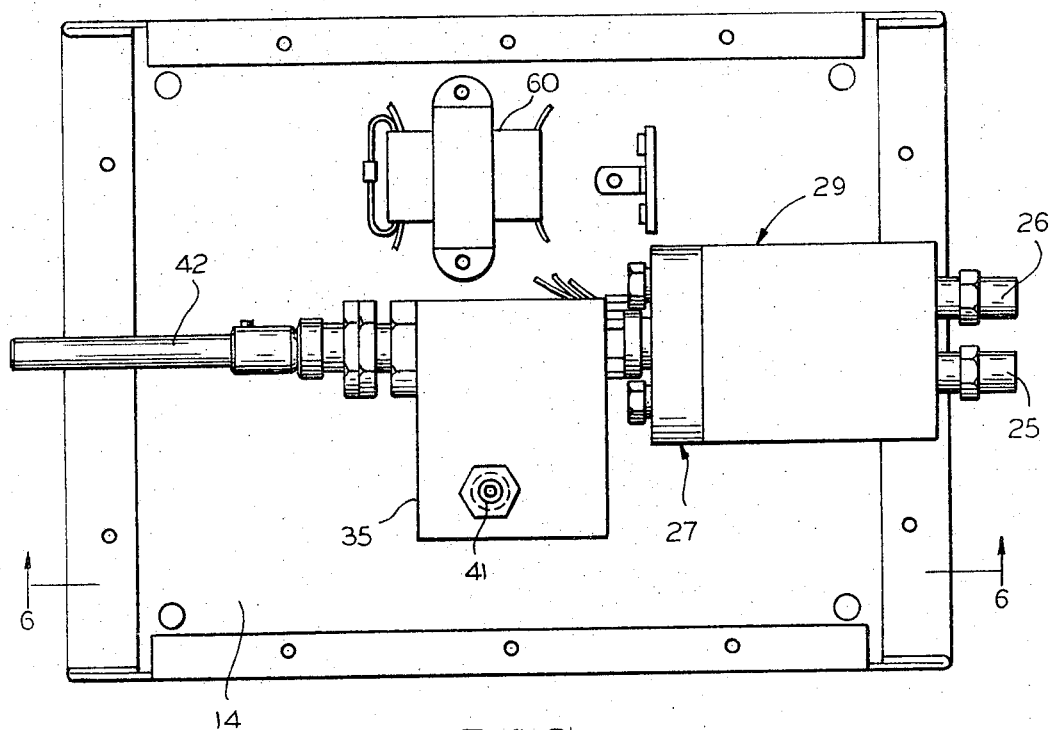
FIG. 5 is a top plan view of the base assembly of the hygrometer, with some parts removed for purposes of clarity, and to illustrate primarily the sampling chamber, the sensor assembly, and the metering valve.
Figure 6:
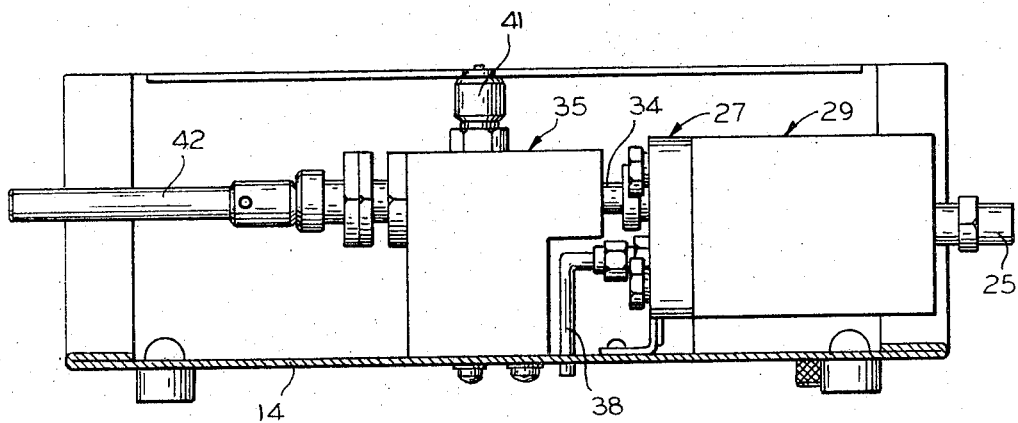
FIG. 6 is a side elevational view of the base assembly and taken substantially along line 5—5 of FIG. 4.

The arrangement of the gas sampling housing 29 and the manual adjustable metering valve 35, together with the sensor assembly 27 is shown in FIGS. 5 and 6, wherein these components are shown mounted on the base panel 14 of the hygrometer housing. A fitting 41 is provided on the metering valve 35 connecting same to compressed gas supply 36 through suitable tubing or the like. A valve control shaft 42 extends from the valve 35 to the front panel and on which the control knob 22 is mounted. The batteries would also be suitably mounted within the hygrometer housing, and preferably on the rear panel 13 of FIG. 2.

Figure 7:
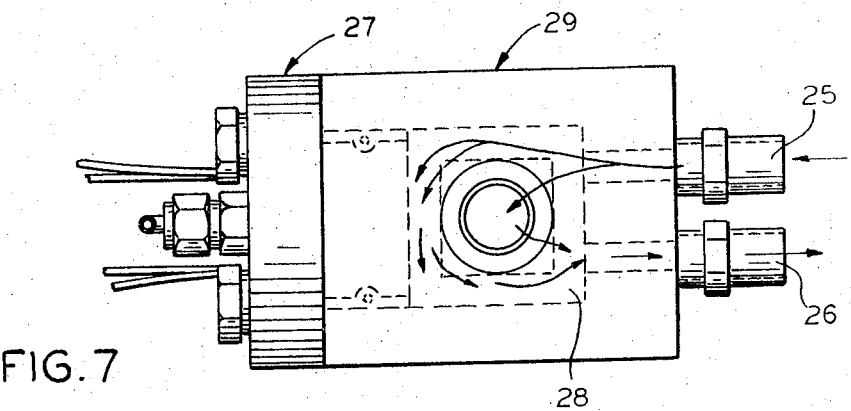
FIG. 7 is a top plan view of the sampling chamber and the sensor assembly with some parts in dotted lines for purposes of clarity.
Figure 8:
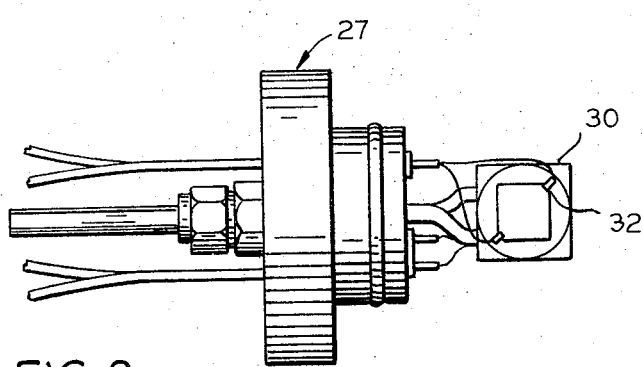
FIG. 8 is a top plan view of the sensor assembly removed from the sampling chamber.
Figure 10:
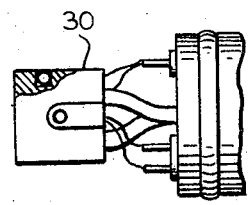
FIG. 10 is a top plan view of the sensor with some parts broken away and other parts omitted for purposes of clarity.
Figure 9:
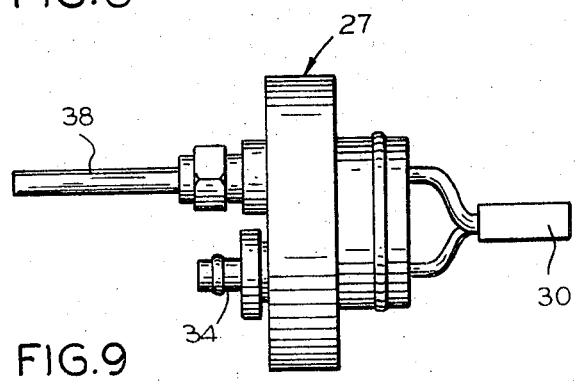
FIG. 9 is a side elevational view of the sensor assembly.
Figure 11:
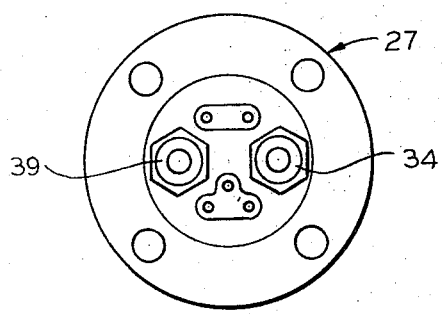
FIG. 11 is an end elevational view of the sensor assembly.

Referring to FIGS. 7 to 11, the sensor assembly 27 is shown in assembled relation with the gas sampling chamber housing 29 in FIG. 7, and as removed from the housing in FIGS. 8 and 9. The inlet tubing 34 is in the form of capillary tubing so as to permit the least amount of expansion possible of the compressed gas as it is transmitted from the supply can 36 to the expansion chamber 31 in the cooling block 30. The outlet tubing 34 is also preferably of the capillary type, but is of a larger diameter than the inlet tubing to assure atmospheric pressure within the expansion chamber to permit expansion of the compressed gas therein for effecting cooling of the cooling block. For example the inner diameter of the inlet tubing may be about 0.026 inches, while that of the outlet tubing may be about 0.070 inches. The cooling block is preferably made of a high heat conductivity metal such as copper. Accordingly, liquid compressed gas, such as Freon, flows from the storage or supply can 36 through the tapping valve 37, the metering valve 35 and to the expansion chamber of the cooling block. The metering valve 35 allows a precise rate of liquid flow to the cooling block where at atmospheric pressure the liquid expands and cools the cooling block and in turn the sensor grid 32 and the thermistor 33. The expanded gas is then exhausted through the outlet tubing 38 to atmosphere.

The sampling gas is drawn into the sampling chamber 31 through the inlet 25 and allowed to flow into intimate contact with the sensor grid 32. Conductivity across the sensor grid depends on the moisture content of the gas. As the cooling block 30 cools, the sensor grid temperature is displayed at the sensor temperature meter 19, and the rate of temperature change is displayed at the cooling rate meter 20. A few degrees above dew point temperature, the molecular water density of the gas will increase and cause the surface resistance to decrease, which will be reflected in the temperature readout and control circuitry 40. The dew point temperature is displayed on the dew point meter 18 when the sensor grid resistance reaches a chosen resistance value which is a given number of degrees above the dew point temperature. As the sensor temperature approaches the dew point temperature, this information is displayed on the sensor temperature meter 19.

Figure 12:
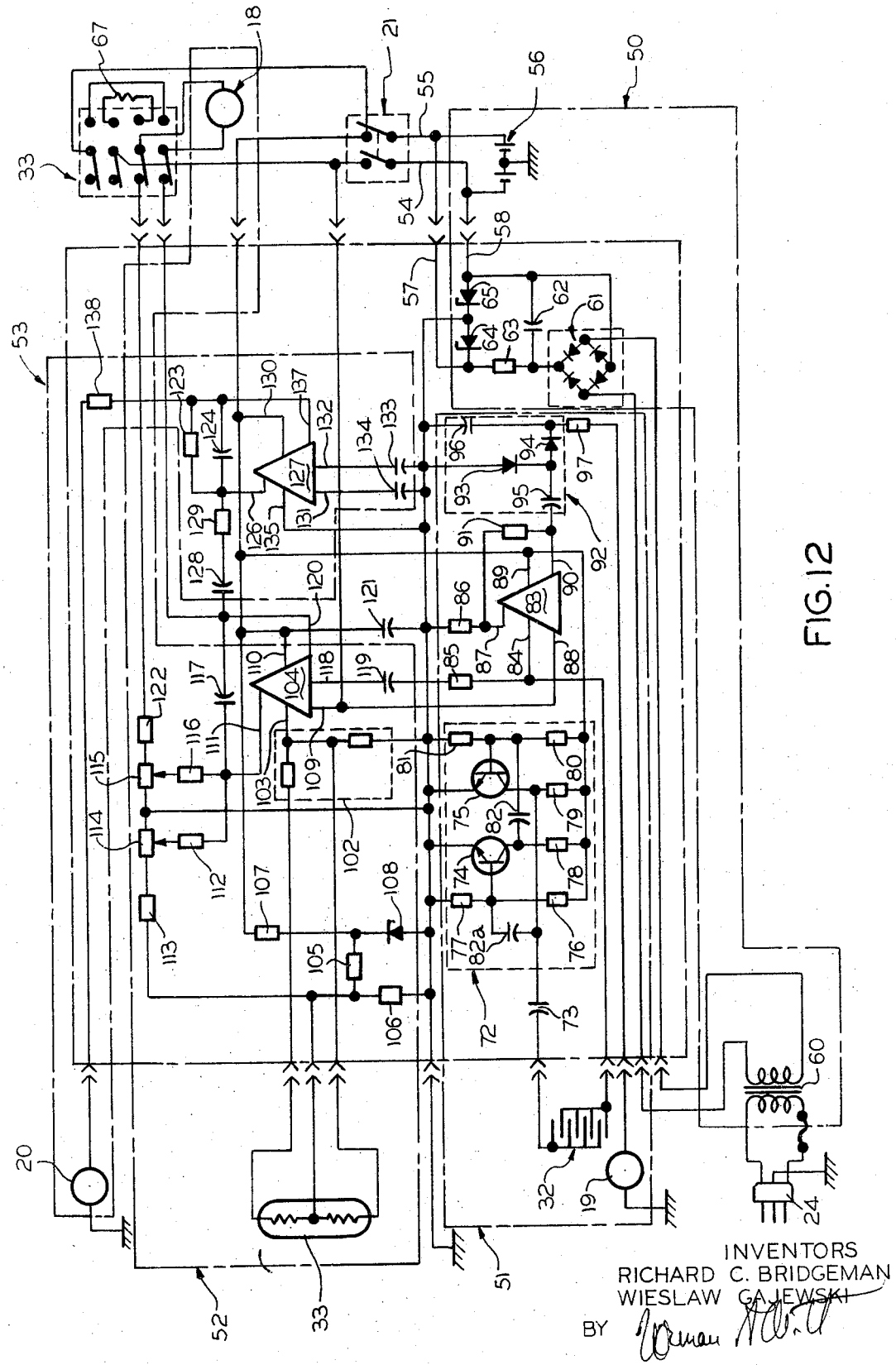
FIG. 12 is an electrical schematic diagram of the temperature readout and control circuitry.

Referring now to the electrical schematic diagram of FIG. 12, a power supply circuit 50 provides the necessary power to operate a sensor temperature circuit 51, a dew point temperature readout circuit 52, and a cooling rate circuit 53.

The power supply circuit enables the dew point hygrometer to be operated from a standard 110 volt AC power, or from batteries that are carried within the housing of the hygrometer. The output of the power supply circuit includes lines 54 and 55 which are connected to batteries 56 and to the output lines 57 and 58 of the AC supply circuit. The AC supply circuit includes the standard line cord 24 for connecting into an AC plug, and a transformer 60 leading to a full wave rectifier 61. The AC circuit further includes a filter capacitor 62 across the rectifier, a current limiting resistor 63, and voltage regulating zener diodes 64 and 65.

The power supply circuit, when the AC line is connected to AC power, shunts the batteries 56, although at the same time the AC power input will charge the batteries. When the AC power is disconnected, the batteries 56 power the other circuits.

A double-pole double-thrown on-off switch 21 selectively connects the power supply to the other circuits. A four pole double throw battery test switch 33 may be selectively operated to determine the condition of the batteries 56 to determine whether they are capable of powering the other circuits of the hygrometer.

When testing the batteries 56, a readout as to battery condition is made on the dew point meter 101. Operation of the battery test switch 66 places a resistor 67 in series with the battery, and a suitable readout indicia 56a is provided on the dew point meter, which indicia if the needle indicator reaches it, indicates the batteries are good.

The sensor temperature circuit 51 includes the sensor grid 32 and the sensor temperature meter 19. The sensor grid functions as a variable impedance, depending on the vapor condition at the cooling block, and the temperature sensor meter 19 translates the resistance of the grid to temperature, and includes a "read region" 19a. When the indicating needle of the meter enters the "read region", the operator then reads the temperature from the dew point meter 18 as the dew point temperature.

The sensor grid 32 is coupled to a mono-stable oscillator 72 through a coupling capacitor 73. The output of the mono-stable oscillator is fed to the sensor grid. The mono-stable oscillator includes transistors 74 and 75, resistors 76, 77, 78, 79, 80 and 81, and capacitors 82 and 82a. An operational amplifier 83 receives an input signal from the sensor grid 32 on line 84, and an inverted input signal from reference resistors 85 and 86 on line 87. Power is supplied to the operational amplifier 83 through lines 88 and 89, while the output of the amplifier is taken from line 90. A feed-back resistor 91 connects between the output line 90 and the input line 87. The output of the operational amplifier is delivered to a voltage doubler 92 comprised of diodes 93 and 94, and capacitors 95 and 96. The output of the voltage doubler is connected through a current limiting resistor 97 to the sensor temperature meter 19.

The dew point temperature readout circuit 52 generally includes the thermistor 33 and the dew point meter 18. The thermistor 33 in combination with a composite resistor 102 provides a linear output as an input through line 103 to an operational amplifier 104 which amplifies the output so that it can be readout. Resistors 105, 106, 107, together with a zener diode 108 set up a reference voltage for the thermistor.

The operational amplifier 104 is powered by the power supply through lines 109 and 110, and receives together with the input from the thermistor through line 103, a calibration input through line 111. Resistors 112, 113 and 114 provide calibration for the zeroing circuit of the meter 101, while the gain is set through feed-back resistors 115, 116 and capacitor 117. Feed-back from the meter 18 comes through a current limiting resistor 122. The frequency of the operational amplifier 104 is compensated through line 118 by the frequency compensating capacitor 119. The output of the operational amplifier 104 through line 120 drives the meter 18. A filtering capacitor 121 is provided in the power supply input line 110.

The cooling rate circuit 53 differentiates the signal from the output of the dew point temperature circuit 52 to determine the cooling rate of the cooling block which must be maintained at a given rate to provide equilibrium in the control circuit and thereby prevent overshooting of the dew point temperature. The preferred rate of cooling is between ½° and 1° per second. The cooling rate is controlled by the metering valve to increase or decrease cooling according to the readout of the cooling rate meter 20, it having a cooling rate indicia region 20a within which the indicator needle is held.

The cooling rate circuitry includes generally a differentiating circuit including resistor 123 and capacitor 124 and the cooling rate meter 20. The output of the dew point temperature circuit 52 is fed to the input line 126 of an operational amplifier 127 in the cooling rate circuit through a coupling capacitor 128 and a current limiting resistor 129. The power supply circuit is connected to the operational amplifier through lines 130 and 131. The frequency of the operational amplifier 127 is compensated through line 132 by frequency compensating capacitor 133. A filtering capacitor 134 is provided in the power supply input line 131. Line 135 is connected to ground. The output line 137 of the operational amplifier 127 is delivered to the differentiating circuit of resistor 123 and capacitor 124, which differentiates the signal output of the dew point temperature circuit to provide the cooling rate signal which is delivered through a current limiting resistor 138 to the cooling rate meter 20. Accordingly, operational amplifier 127 together with the resistor 123 and capacitor 124 differentiates the output of the dew point temperature readout operational amplifier 104 to determine cooling rate. Essentially, the rate of change of the output of the operational amplifier 104 is detected here.

When a chosen resistance value across the sensor grid 32 is reached, which would be related to a given number of degrees above dew point temperature, then the indicator needle of the sensor temperature meter 19 will be in the "read out" region 19a, telling the operator to read the dew point temperature from the dew point meter 18. The dew point meter 18 is calibrated to indicate a temperature above that of the sensor block correlated to the chosen resistance value measured by the sensor grid 32.

It will be understood that modifications and variations may be effected without departing from the scope of the novel concepts of the present invention, but it is understood that this application is to be limited only by the scope of the appended claims.

We claim:

1. A portable dew point hygrometer comprising, a gas sampling chamber having a sampling gas inlet and a sampling gas outlet, a sensor assembly within said chamber including a gas cooling member against which sampling gas impinges, a pair of spaced conductivity electrodes and a temperature sensing element on said member, means for adjustably cooling said member to drive the temperature of the gas impinging thereon towards dew point temperature, and temperature measuring and readout circuitry including first means responsive to the temperature of the gas measured by the temperature sensing element and providing a readout indicating the cooling rate of the gas, second means responsive to the resistance of the gas measured at the conductivity electrodes for relating resistance to dew point temperature and providing a readout indicating when a given measured resistance is reached, and third means responsive to said temperature sensing element and providing a readout indicating dew point temperature which is readable when said second means indicates said given resistance.

2. A dew point hygrometer as defined in claim 1, wherein said means for cooling said gas cooling member includes a gas expansion chamber in said member having an inlet and an outlet thereto, a supply of compressed gas, tubing means connecting said inlet and said supply, a metering valve in said tubing means between said supply and said expansion chamber inlet, and tubing means connecting said outlet with the atmosphere.

3. The combination as defined in claim 2, wherein said inlet and outlet tubing means of said expansion chamber comprises capillary tubing such as to inhibit expansion of the gas ahead of the expansion chamber and to permit expansion of the gas in the chamber to effect cooling.

4. The combination as defined in claim 3, wherein the inner diameter of the inlet tubing means is substantially smaller than that of the outlet tubing means.

5. A dew point hygrometer as defined in claim 1, wherein said temperature sensing element is a linear precision thermistor.

6. A dew point hygrometer as defined in claim 1, wherein the compressed gas is Freon.

* * * * *